United States Patent [19]

Underwood et al.

[11] Patent Number: 5,873,066
[45] Date of Patent: Feb. 16, 1999

[54] SYSTEM FOR ELECTRONICALLY MANAGING AND DOCUMENTING THE UNDERWRITING OF AN EXCESS CASUALTY INSURANCE POLICY

[75] Inventors: Robert B. Underwood, Vorhees, N.J.; William F. Wall, Roswell, Ga.; John R. Platt, St. Charles, Ill.; Patricia A. Bens, Wayne, Pa.; Richard Dely, La Crescenta, Calif.; Michael Grady, Bryn Mawr; Jerry Flynn, North Wales, both of Pa.

[73] Assignee: Insurance Company of North America, Philadelphia, Pa.

[21] Appl. No.: 796,465

[22] Filed: Feb. 10, 1997

[51] Int. Cl.[6] .......................... G06F 17/60; G06F 157/00
[52] U.S. Cl. ...................................... 705/4; 705/2
[58] Field of Search ................................ 705/2–4; 283/54

[56] References Cited

U.S. PATENT DOCUMENTS

| | | | |
|---|---|---|---|
| 4,975,840 | 12/1990 | DeTore et al. | 705/1 |
| 5,191,522 | 3/1993 | Bosco et al. | 705/1 |
| 5,523,942 | 6/1996 | Tyler et al. | 705/1 |

OTHER PUBLICATIONS

United National Insurance Co., United Natl Insurance: Posts 1991 gross premiums . . . , Business Insurance, Aug. 17, 1982, p. 26, Dialog file 16, Accession No. 03986691.

Otis, L. H., All roads don't lead to cat. Coverage (catastrophe coverage)(Non–Traditional Reinsurance Review), National Underwriter Property & Casualty–Risk & Benefits Management, N49, p3 (3), Dec. 2, 1996, Dialog file 148, Accession No. 09171072.

Culbert, J. L., "National Insurance Group–company Report", Chicago Corporation (The), Dialog file 545, Accession No. 04137737.

*Primary Examiner*—Frantzy Poinvil
*Attorney, Agent, or Firm*—Reedsmith Shaw & McClay LLP

[57] ABSTRACT

A computer-implemented system for managing the underwriting, quoting and binding by an insurance company of an excess casualty insurance policy for an insured having a primary insurance policy with a primary insurance limit amount. The system selects and stores at least one standard industrial classification code ("SIC code") associated with the insured and a primary carrier name or multiple carriers associated with the primary insurance policy. A plurality of SIC code records corresponding to a plurality of SIC codes are stored in a database. Each of the SIC code records are linked to underwriting guidelines established and filed by the insurance carrier. These criteria include guidelines related to minimum premiums, hazard rating, underwriting authority, and referral criteria. Primary insurance carrier public bureau rating records are also stored in the database. Each of the primary insurance carrier public bureau rating records includes a field for storing a rating code representing a financial stability rating associated with a primary insurance carrier. The system displays for the insurance carrier underwriter a plurality of candidate risk modifiers associated with the retrieved SIC code record, and for documenting and storing a selected risk modifier code and related underwriting criteria associated with the policy. The system develops the quotation using a detailed description of the insured's operation, the minimum premium amount information, the selected hazard code, the selected risk modifier code, primary insurance limits, and one or more attachment points.

5 Claims, 13 Drawing Sheets

SYSTEM FOR ELECTRONICALLY MANAGING AND DOCUMENTING THE UNDERWRITING OF AN EXCESS CASUALTY INSURANCE POLICY

FIELD OF THE INVENTION

The present invention relates generally to computer systems for managing insurance underwriting. More particularly, the present invention relates to computer systems for managing insurance underwriting and related processes associated with the excess casualty insurance business.

BACKGROUND

When an entity that has purchased a primary insurance policy wishes to insure against risks that may exceed the limits of its primary (or underlying) insurance policy, the entity may look to purchase excess insurance. Thus, the purpose of an excess insurance policy is to cover an insured in the event that the insured incurs liability that is in excess of the coverage limits of its primary insurance policy. Typically, one or more layers of excess insurance policies may be used to supplement a particular primary insurance policy. For example, an insured may purchase a primary insurance policy with a coverage limit of $10 million, a first excess insurance policy which would cover losses in excess of $10 million up to a further limit of $20 million, and a second excess policy which would cover losses in excess of $20 million up to a further limit of $30 million. The first excess insurance policy is said to have an "attachment point" of $10 million, because the coverage offered by the policy will not be invoked unless the insured's liability exceeds $10 million. Similarly, the second excess insurance policy has an "attachment point" of $20 million, because the coverage offered by that policy will not be invoked unless the insured's liability exceeds $20 million. When there are multiple excess insurance policies, each of the policies will typically be written by a different insurance company, and will be reinsured through other insurance companies.

Companies often purchase excess insurance to cover losses for remote events that may not occur for many years into the future. For example, a drug company may purchase such insurance to cover unknown adverse effects which may only manifest themselves in a patient many years after the patient has taken the drug company's product. Since excess policies involve risks that may be 20–30 years into the future, it is important for all relevant information pertaining to the excess policy to be properly documented and permanently stored at the time that the policy is initially issued.

Insurance companies that write excess insurance often receive submissions through licensed insurance wholesalers, brokers and retail producers. When such an insurance business producer wishes to compete for an excess policy, it is important for the insurance company to be able to provide the business producer with a quote which accurately reflects the characteristics of the risk, and, if necessary, to audit any information provided by the business producer before any quote is issued.

It is therefore an object of the present invention to provide a system for quoting, binding and later issuing an excess insurance contract in which all relevant information pertaining to the risk is properly documented and permanently stored.

It is a further object of the present invention to provide a system for quoting excess insurance which requires the quoted premium to accurately reflect the risks associated with a policy, and which permits the auditing of the risk characteristics, rating and pricing methodology associated with a quote before it is issued.

These and other objects and advantages of the invention will become more fully apparent from the description and claims which follow or may be learned by the practice of the invention.

SUMMARY OF THE INVENTION

The present invention is directed to a computer-implemented system for managing the underwriting, quoting and binding by an insurance company of an excess casualty insurance policy for an insured having a primary insurance policy with a primary insurance limit amount. Means are provided for selecting and storing at least one standard industrial classification code ("SIC code") associated with the insured and a primary carrier name or multiple carriers associated with the primary insurance policy. A plurality of SIC code records corresponding to a plurality of SIC codes are stored in a database. Each of the SIC code records are linked to underwriting guidelines established and filed by the insurance carrier. These criteria include guidelines related to minimum premiums, hazard rating, underwriting authority, and referral criteria. Primary insurance carrier public bureau rating records are also stored in the database. Each of the primary insurance carrier public bureau rating records includes a field for storing a rating code representing a financial stability rating associated with a primary insurance carrier. Means are provided for retrieving a primary insurance carrier rating record associated with the insured from the database and for comparing the rating code stored in the primary insurance carrier rating record to an acceptable predetermined rating level. If the rating code associated with the primary insurance carrier is below the predetermined rating level, means are provided for declining the quotation and/or initiating a home office referral process. Means are also provided for retrieving an SIC code record associated with the SIC code of the insured, for displaying for the insurance carrier underwriter hazard rating information linked to the SIC code record, and for receiving and storing one of a plurality of hazard codes selected by the insurance carrier underwriter in response to the displayed hazard rating information. Means are further provided for displaying for the insurance carrier underwriter a plurality of candidate risk modifiers associated with the retrieved SIC code record, and for documenting and storing a selected risk modifier code and related underwriting criteria associated with the policy. Finally, means are provided for developing the quotation using a detailed description of the insured's operation, the minimum premium amount information, the selected hazard code, the selected risk modifier code, primary insurance limits, and one or more attachment points.

BRIEF DESCRIPTION OF THE DRAWINGS

In order that the manner in which the above-recited and other advantages and objects of the invention are obtained and can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention and the presently understood best mode thereof will be described and explained with additional specificity and detail through the use of the accompanying drawings.

DETAILED DESCRIPTION OF THE INVENTION

Figure 1:
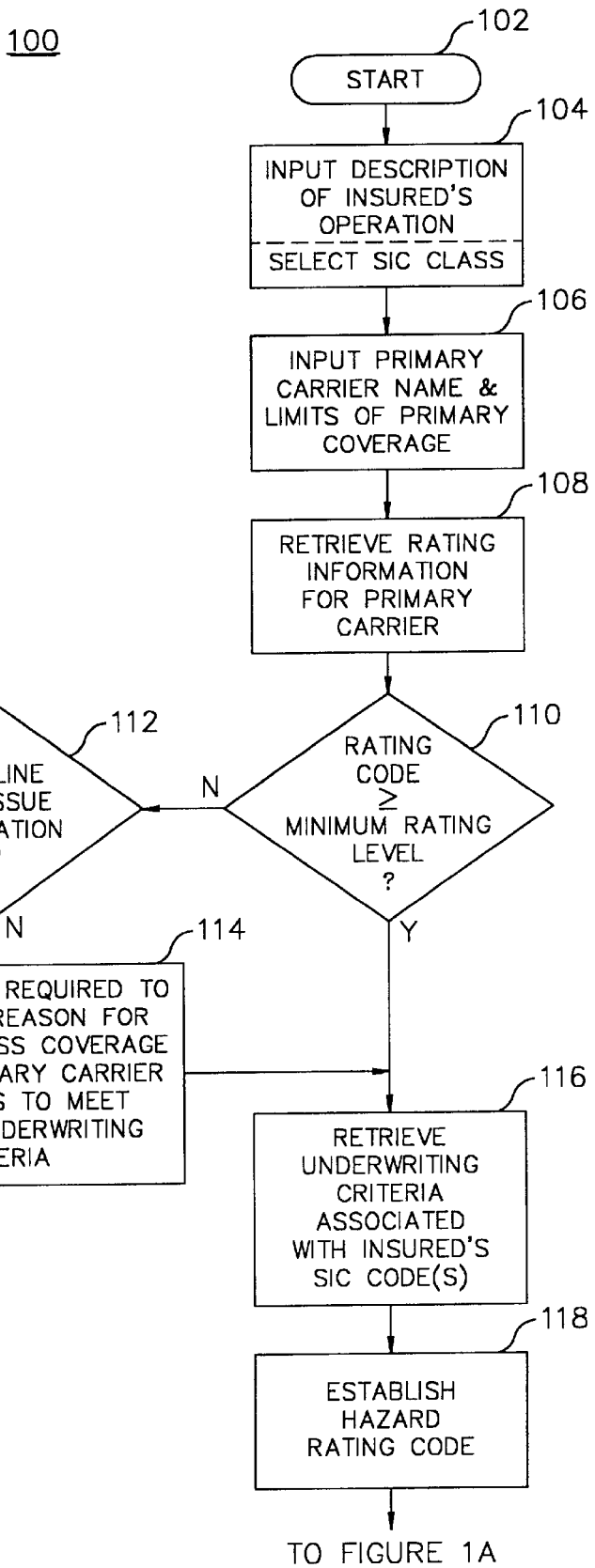
FIGS. 1, 1A and 1B depict a flow diagram illustrating the operation of a computer-implemented system for managing the analysis, quotation, binding and issuing by an insurance carrier underwriter of an excess casualty insurance policy, in accordance with a preferred embodiment of the present invention.
Figure 1A:
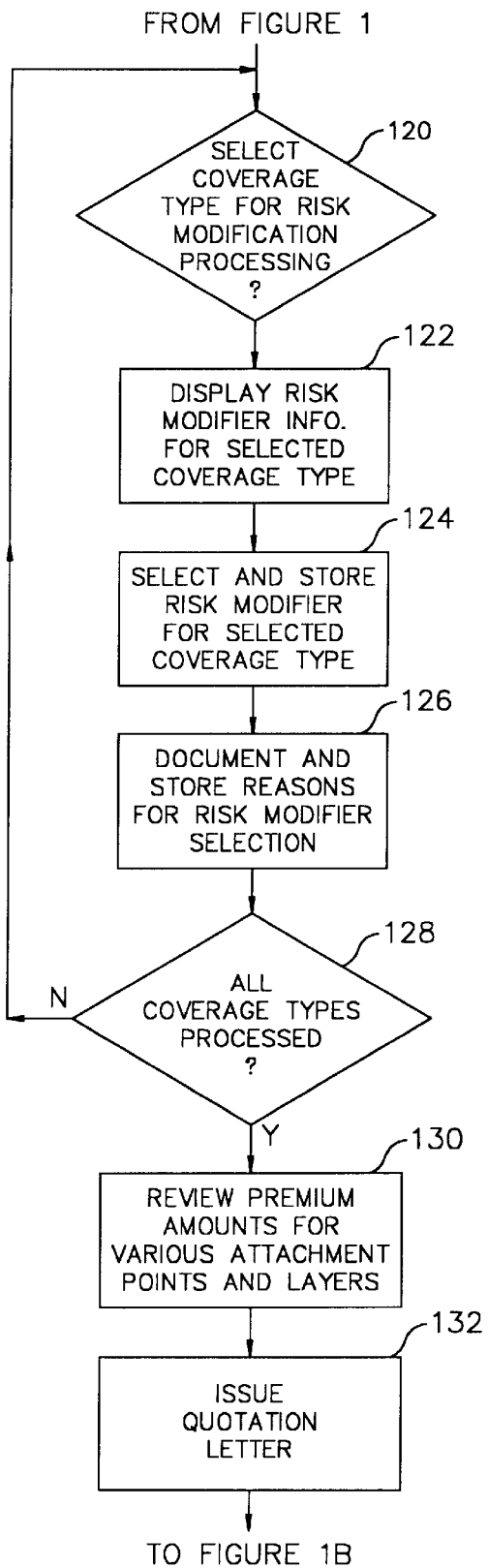
Figure 1B:
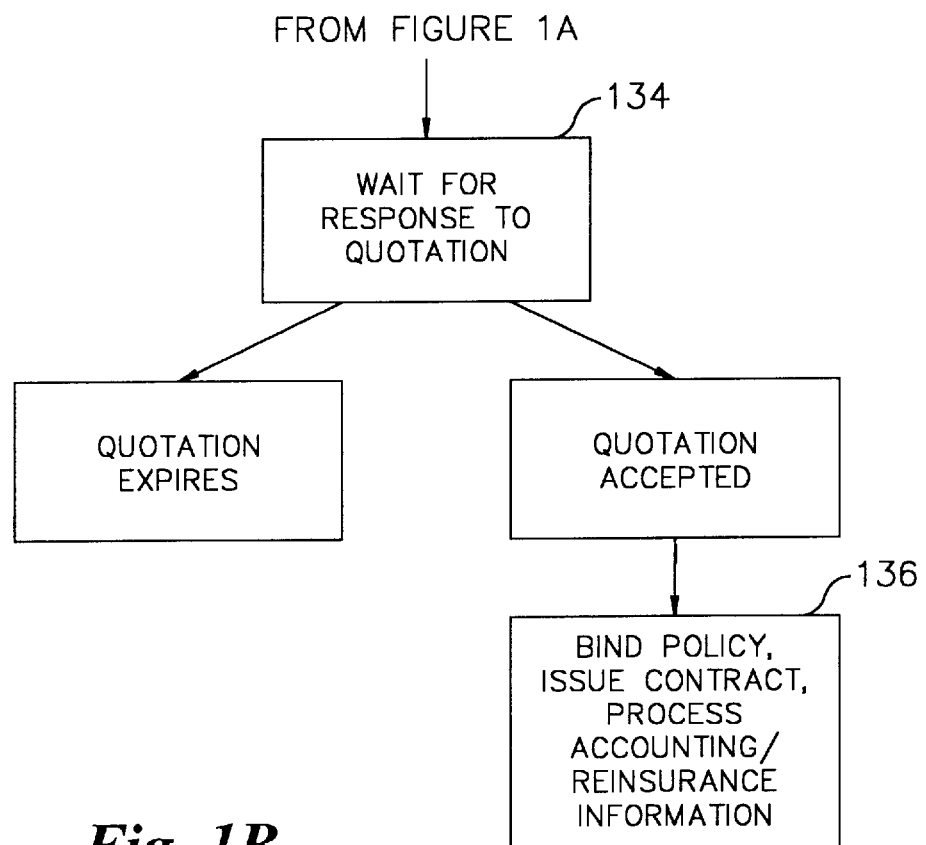

Referring now to FIGS. 1, 1A and 1B, there is shown a flow diagram illustrating the operation of a computer-implemented software system 100 for managing the analysis, quotation, binding and issuing by an insurance carrier underwriter of an excess casualty insurance policy, in accordance with a preferred embodiment of the present invention. Software system 100 is preferably implemented on a computer network (such as that shown in FIG. 2) which allows users to access system 100 and issue quotations for excess casualty insurance policies from remote locations which are geographically separated from the home office of the insurance carrier.

Figure 6:
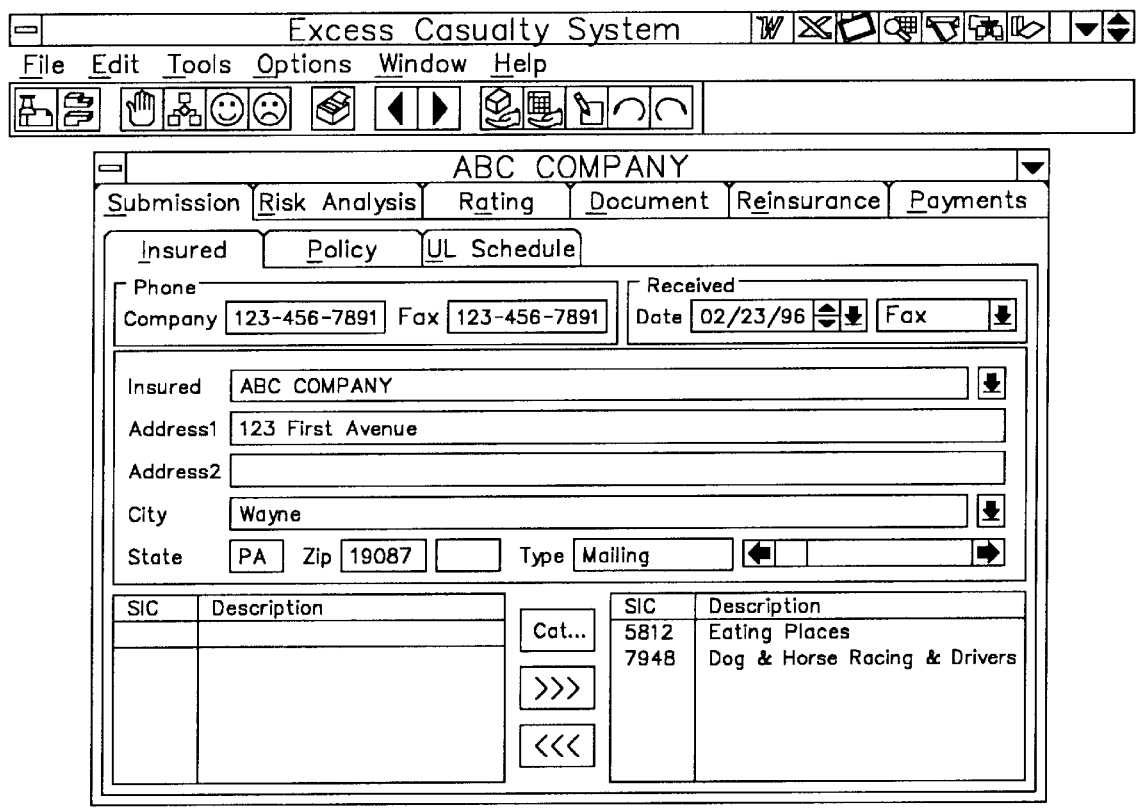
FIG. 6 illustrates a graphical user interface used by an insurance carrier for inputting information about an insured and assigning a standard industry classification which describes the operation of the insured, in accordance with preferred embodiment of the present invention.

In a first step 102, a user logs into system 100 through a workstation, such as, for example, workstation 210. Following a successful logon, the system proceeds to step 104, where the user enters into the system information pertaining the insured party for whom an excess casualty insurance quotation is to be prepared. Such information includes, for example, the name, address, telephone number and fax number of the insured party, the date the request for the quotation was received, a description of the insured's operation and the SIC codes which are associated with the insured's business. A graphical user interface, such as that shown by FIG. 6, is preferably used to facilitate the inputting of this information into the system in step 104.

Figure 7:
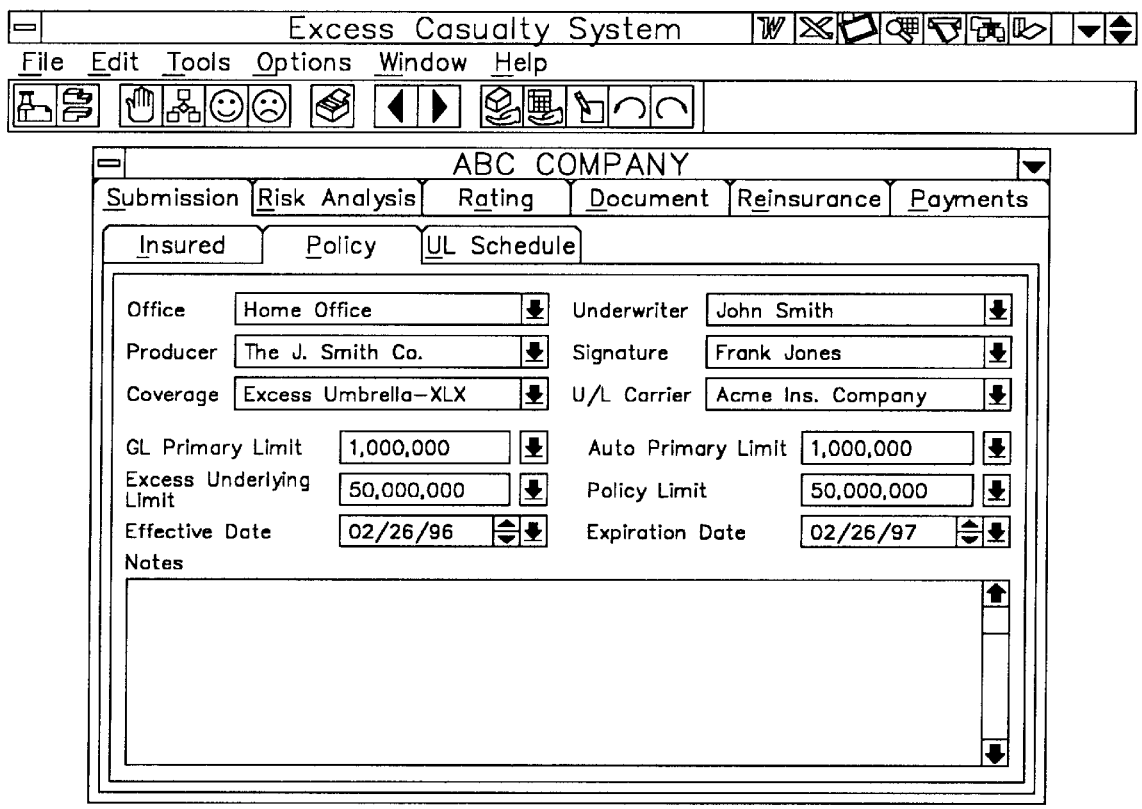
FIG. 7 illustrates a graphical user interface used by an insurance underwriter for documenting an insured's limits, attachment points, contract duration and for retrieving public bureau rating information regarding underlying carrier (s), in accordance with a preferred embodiment of the present invention.

Next, the system proceeds to step 106, where the user enters into the system the name of the primary carrier (or U/L carrier), and the coverage type and coverage limits of the primary insurance policy which is to lie under the excess casualty insurance policy being quoted. Since the underlying primary insurance policy may have separate limits for general liability and auto liability coverages, the insurance business producer may enter separate primary coverage limits for general liability and auto liability coverages in this step. In addition, in step 106, the insurance business producer enters into the system excess policy limits, the effective and expiration dates of the proposed insurance contract, and a description of the insured operation. A graphical user interface, such as that shown by FIG. 7, is preferably used to facilitate the inputting of all of this information into the system in step 106. The description of the insured operation is preferably inputted into the notes section of the graphical user interface shown in FIG. 7.

In step 108, the system retrieves public bureau rating information associated with the primary insurance carrier name that was entered into the system in step 106. As explained more fully below in conjunction with FIG. 4, the present invention maintains a database which contains a rating corresponding to each primary insurance carrier name that might be entered into the system in step 106. In step 110, the rating associated with the primary insurance carrier which will underlie the excess casualty insurance being quoted is compared against a predetermined minimum financial rating threshold established by the business issuing the excess insurance quotation. If, as a result of this comparison, the system determines that the rating of the primary insurance carrier is below the predetermined threshold, the system proceeds to step 112, where the insurance underwriter is given the option to decline to issue a quotation or refer the submission to home office for review and discussion. If the user declines to issue the quotation in step 112, then the system automatically generates a declination letter indicating that no quote will be submitted for the excess casualty policy; otherwise, the system proceeds to step 114 where the user is required to document reasons for writing excess coverage over a primary carrier that does not meet minimum underwriting criteria. This documentation preferably takes place on-line and is directly entered into the system by the insurance underwriter via an on-screen "notes" window, such as that shown in the graphical user interface of FIG. 7. The documentation entered by the user in step 114 is stored electronically by the system as part of a computer file associated with the risk, and may be used at the home office of the insurance carrier for approving a quotation. In addition, the documentation entered in this and subsequent steps may be used for auditing purposes by the home office, reinsurers or state regulators.

Figure 8:
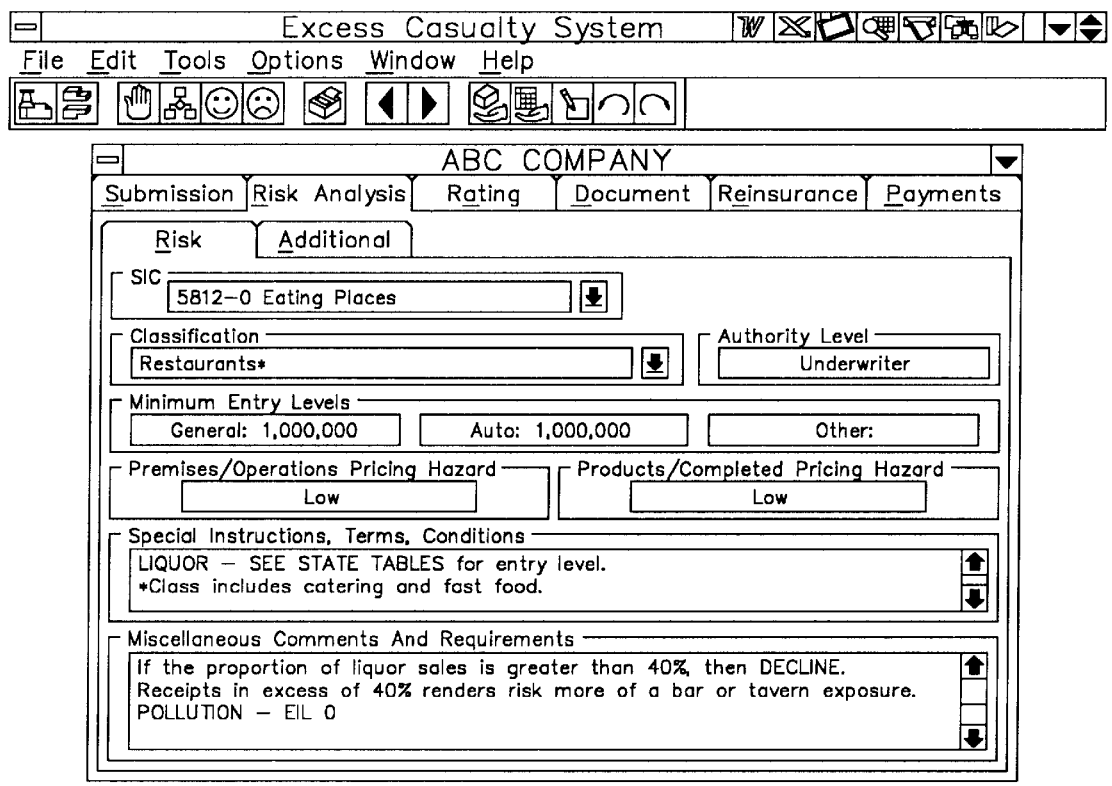
FIG. 8 illustrates a graphical user interface used by an insurance underwriter to review underwriting criteria established for the class of business of the insured, in accordance with a preferred embodiment of the present invention.

Next, in step 116, the system retrieves and displays underwriting guidelines associated with the SIC codes that were previously entered in step 104. As explained more fully below in conjunction with FIG. 3, the present invention maintains a database which contains underwriting instructions and guidelines, including minimum premiums and hazard rating instructions, corresponding to each SIC code that a user might enter into the system in step 104. The hazard rating instructions contain information/factors which the user should consider when analyzing a risk associated with a particular SIC code. A graphical user interface, such as that shown by FIG. 8, is preferably used for displaying this hazard rating information to the user in step 116. Based on this hazard rating information, the user selects one or more hazard ratings for the quotation in step 118. The selected hazard rating(s) are then stored in the system's database as part of the computer file associated with the quotation.

Figure 9:
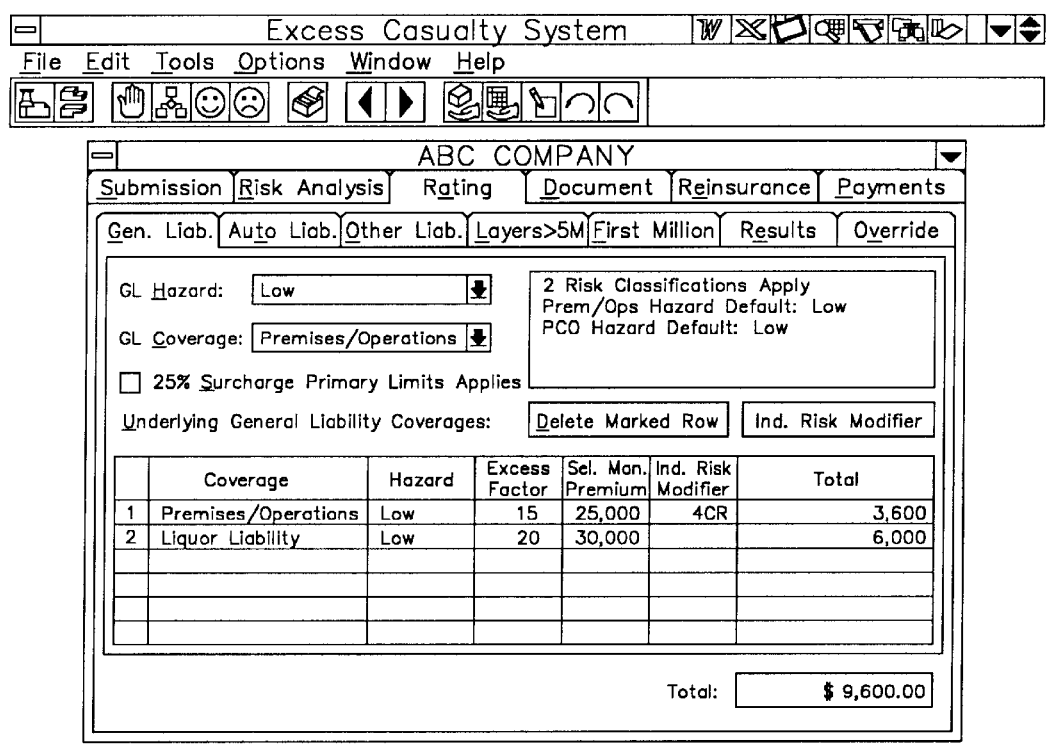
FIG. 9 illustrates a graphical user interface used by an insurance underwriter for rating and documenting the general liability coverages associated with a risk, in accordance with a preferred embodiment of the present invention.

Next, in step 120, the user selects one or more of the coverage types which are applicable to the excess casualty insurance policy being quoted. Thus, for example, if the policy being quoted included coverages for (i) premises/operations liability and (ii) liquor liability, one of these two coverage types would be selected. Thereafter, in step 122, the system displays a range of predetermined risk modifiers for the selected coverage. A risk modifier is used to indicate where the specific risk falls in relation to a base or average risk for a given classification. The extent of the insured's management experience and/or loss control programs that the insured may have instituted may influence whether use of a risk modifier is appropriate in a particular case. In steps 124 and 126, the user selects one of the predetermined risk modifiers for the selected coverage, and then documents the reasons or bases (e.g., management experience or loss control programs) for the specific risk modifier that the user selected. This documentation takes place on-line and is directly entered into the system by the user via an on-screen "notes" window. The risk modifier selection and documentation entered in steps 124–126 are stored electronically by the system as part of a computer file associated with the quotation. Among other things, the documentation entered in step 126 may be used for auditing purposes. A graphical user interface, such as that shown by FIG. 9, is preferably used for facilitating the selection of the risk modifier and the documentation thereof in steps 120 to 126. As indicated by step 128, this above process (steps 122–126) is then repeated for each type of excess coverage that is to be included as part of the quotation.

Figure 10:
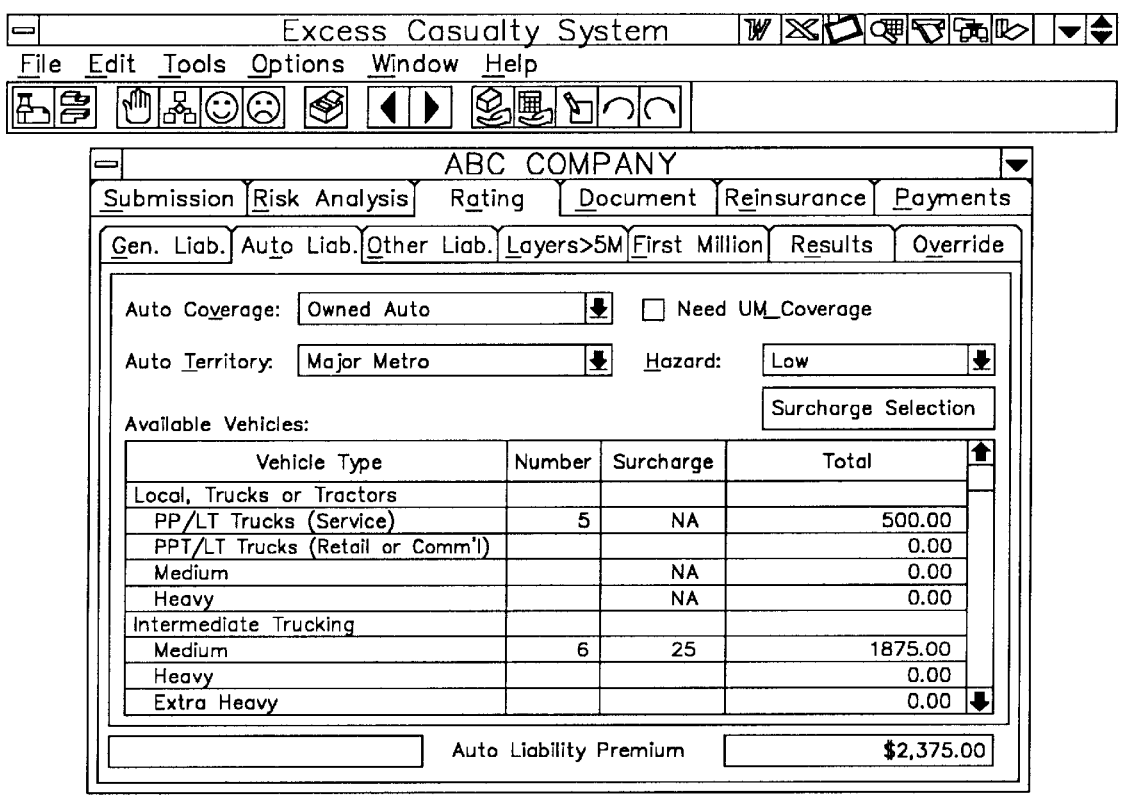
FIG. 10 illustrates a graphical user interface used by an insurance underwriter for rating and documenting automobile coverages associated with a risk, in accordance with a preferred embodiment of the present invention.

In the event that the excess casualty insurance policy being quoted is also directed to automobile liability, the user will next enter into the system information such as the auto coverage type being quoted (e.g., owned automotive coverage or leased automotive coverage), the geographical territory that is applicable to the automotive coverage, the various vehicle types and numbers of vehicles used by the insured, and whether a surcharge amount should be applied in the quotation for automotive coverage relating to any of the vehicle types which would be covered by the policy. If the user selects a surcharge for one of the vehicle types, the system requires the user to document the reasons or bases for the selected surcharge. Again, this documentation preferably takes place on-line and is directly entered into the system by the user via an on-screen "notes" window. The automotive surcharge selection and documentation entered in support of any surcharge selection are stored electronically by system as part of a computer file associated with the quotation. Among other things, this documentation may also be used for auditing purposes. A graphical user interface, such as that shown by FIG. 10, is preferably used for facilitating the entry into the system of automobile coverage and surcharge information.

Figure 11:
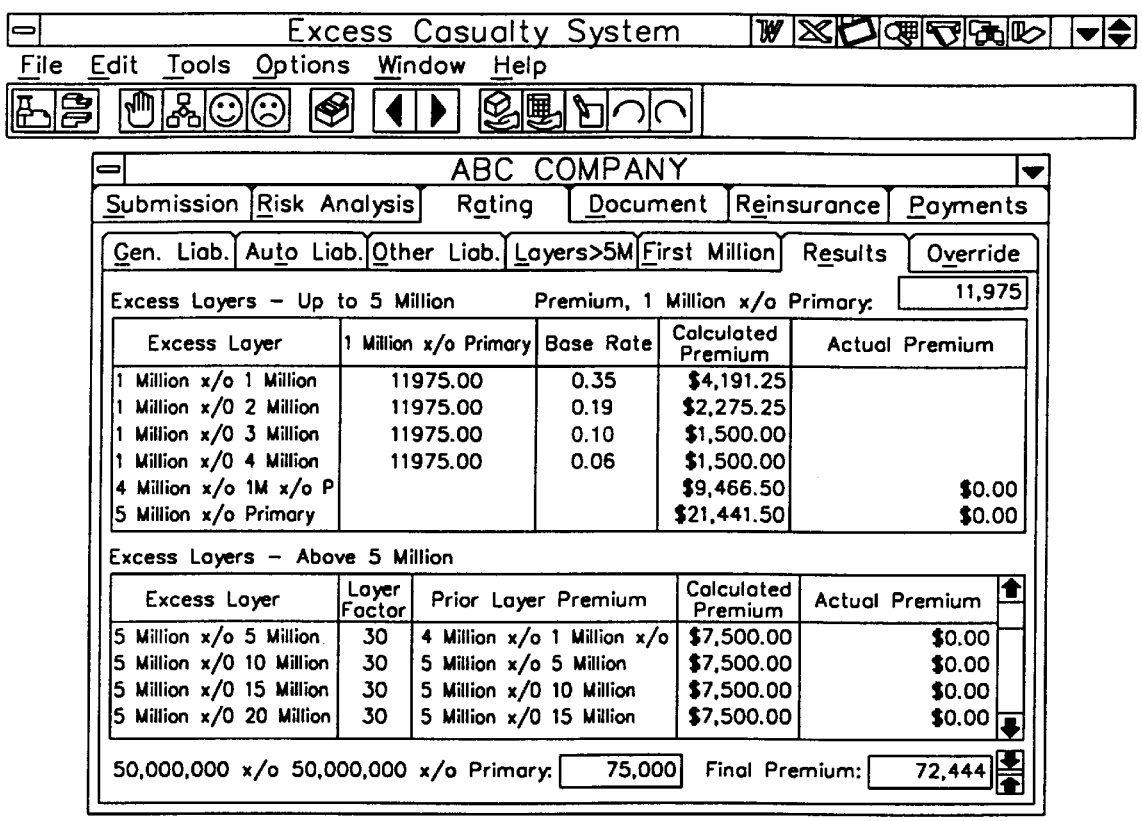
FIG. 11 illustrates a graphical user interface used by an insurance underwriter to review by layer premium information calculated from previous rating worksheets, in accordance with a preferred embodiment of the present invention.

In step 130, the system generates excess casualty insurance premium amounts corresponding to a plurality of different excess insurance attachment points and layer amounts. For each attachment point and layer amount combination, the corresponding premium amount generated by the system is based on, among other things, a minimum premium amount associated with the SIC code(s) input in step 104, the hazard rating code(s) selected in step 118, and the risk modifier code(s) selected in step 126. In a preferred embodiment, the premium amounts are generated in step 130 from a lookup table stored in the system's database. A graphical user interface, such as that shown by FIG. 11, is preferably used for displaying and reviewing the premium information generated in this step.

Figure 12:
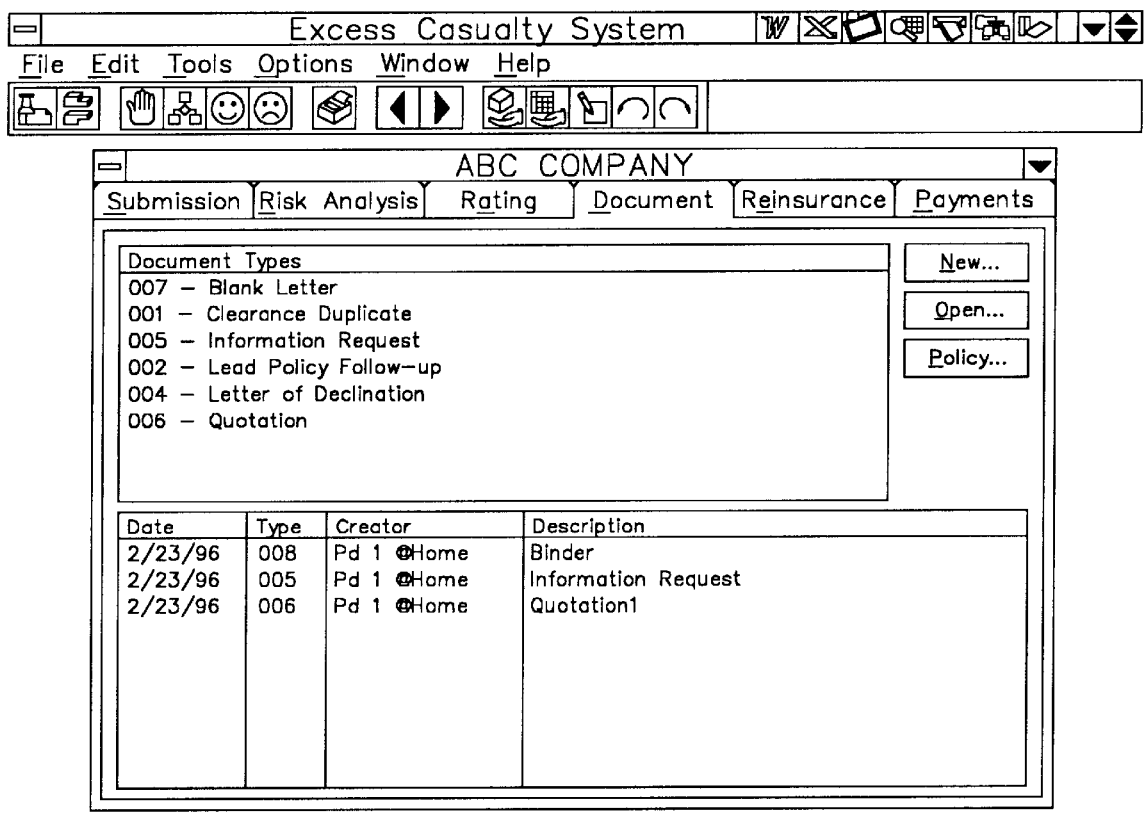
FIG. 12 illustrates a graphical user interface used by an insurance underwriter for generating and storing all documentation corresponding to a particular insured, in accordance with a preferred embodiment of the present invention.

Next, in step 132, the user selects one or more of the attachment points and layer amounts generated in step 130 for quotation, and the system then automatically generates a quotation letter describing the particulars of the excess casualty policy being quoted and reciting a premium amount for the policy. The quotation letter is then forwarded (via electronic fax) to the insured. At the same time, the quotation letter is stored electronically by system as part of a computer file associated with the quotation. A graphical user interface, such as that shown by FIG. 12, is preferably used for assisting in the automatic generation and storage of documents such as the quotation and declination letters described above.

Figure 13:
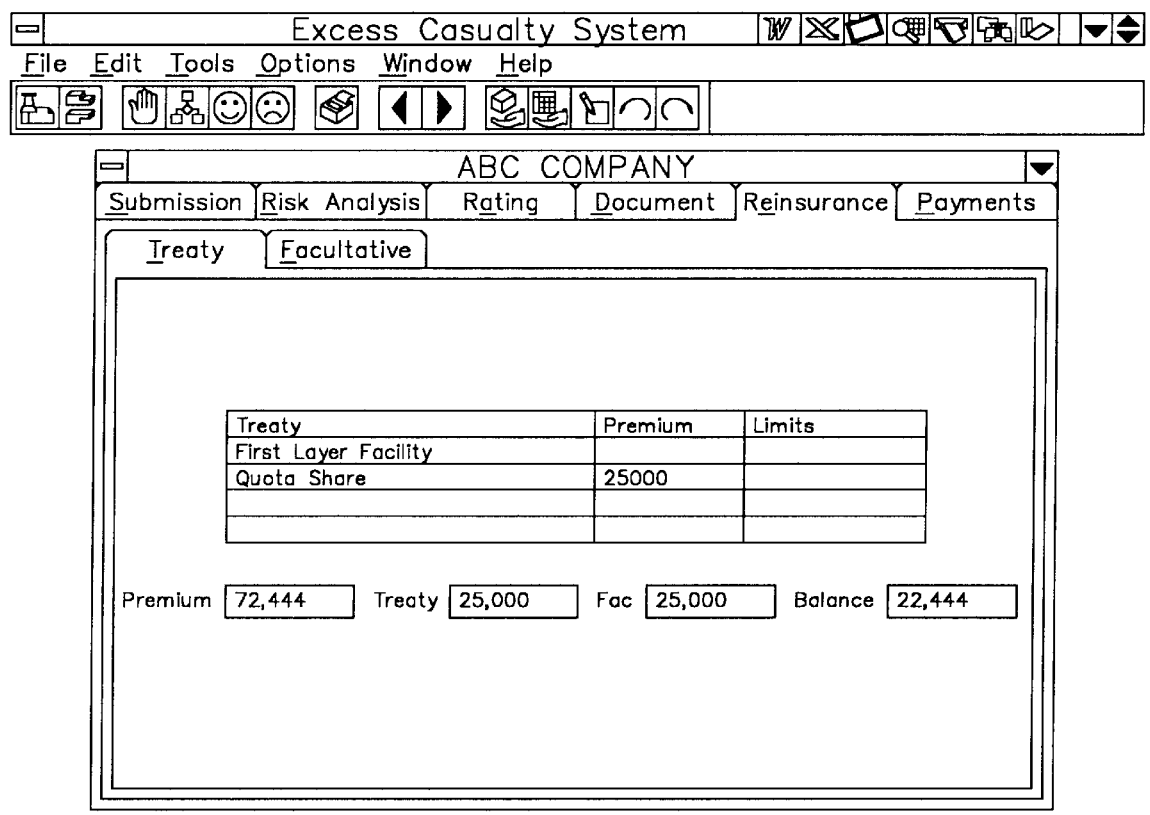
FIG. 13 illustrates a graphical user interface used by an insurance underwriter for generating reinsurance information corresponding to a particular excess insurance policy, in accordance with a preferred embodiment of the present invention.

After the quotation is issued in step 132, the system waits for a response to the quotation. In the event that the quotation is accepted, the system proceeds to step 136 where the policy is bound. At the time of binding, the insurance business producer is required to enter into the system information relating to the reinsurance of the policy which has been bound. A graphical user interface, such as that shown by FIG. 13, is preferably used for assisting with the inputting of this reinsurance information into the system.

Figure 2:
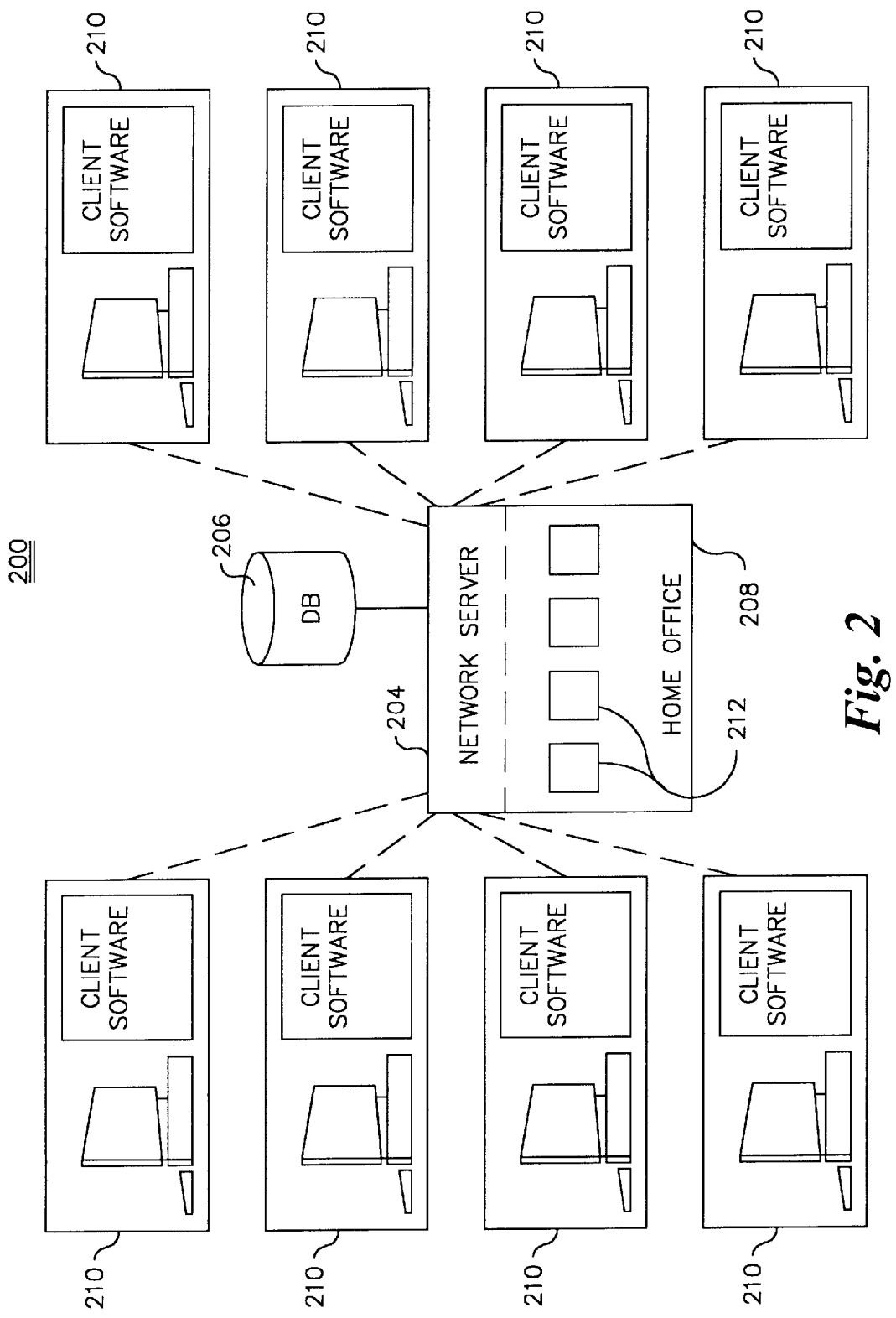
FIG. 2 is a hardware block diagram illustrating the operation of a computer-implemented system for managing the analysis, quotation, binding and issuing by an insurance carrier underwriter of an excess casualty insurance policy, in accordance with a preferred embodiment of the present invention.

Referring now to FIG. 2, there is shown a hardware block diagram of a system 200 for implementing the software system 100 described above, in accordance with a preferred embodiment of the present invention. System 200 is preferably formed of a plurality of remote workstations 210, each of which includes client software for communicating with a network server 204 located at the home office 208 of the excess casualty insurance company that is being requested to issue the quotation. A plurality of workstations 212 are included at the home office for auditing quotation information submitted through workstations 210. A database 206 is coupled to the network server 204, and is used for storing information input into the system, all documentation created during the quotation process, rating information for each primary insurance carrier name that might be entered into the system, a minimum premium amount and hazard rating information corresponding to each SIC code that might be entered into the system, a range of risk modifiers corresponding to each potential coverage type, and rate lookup tables for generating the premium amounts in step 130 described above.

Figure 3:
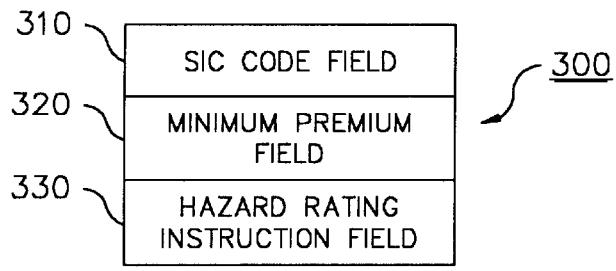
FIG. 3 is a block diagram illustrating the data structure of a record used for storing underwriting information linked with classification codes, in accordance with a preferred embodiment of the present invention.
Figure 4:
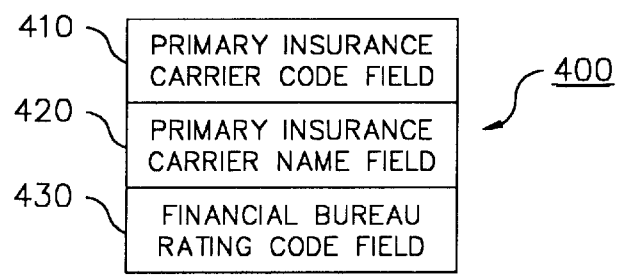
FIG. 4 is a block diagram illustrating the data structure of a record used for storing public information associated with primary insurance carriers, in accordance with a preferred embodiment of the present invention.

Block diagrams illustrating preferred data structures used for storing (in database 206) information associated with SIC codes and primary insurance carriers are shown in FIGS. 3 and 4, respectively. Thus, for each SIC code that might be entered into the system, a record 300 is stored in the database 206 and includes an SIC code field 310 corresponding to a particular SIC code, a minimum premium field 320 for storing a minimum premium amount associated with the SIC code, and a hazard rating instruction field 330 for storing hazard information associated with the SIC code. In addition, for each primary insurance carrier that might be entered into the system, a record 400 is stored in the database 206 and includes fields for 410, 420 which correspond to a name and a number associated with a particular primary insurance carrier, and a field 430 for storing financial stability rating information associated with the primary carrier.

Figure 5:
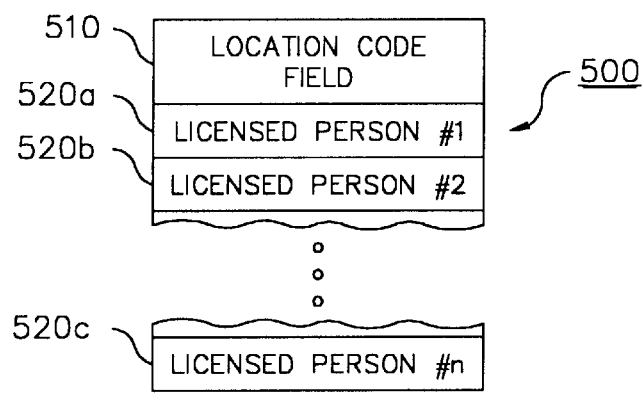
FIG. 5 is a block diagram illustrating the data structure of a record used for storing information representing the locations of licensed persons available for accommodating state insurance regulations, in accordance with a preferred embodiment of the present invention.

Finally, referring now to FIG. 5, a plurality of data records 500 are stored in database 206 for identifying producers licensed to do business in a particular jurisdiction or location (represented in field 510) with resident or non-resident licenses. Such persons are available for accommodating state regulations which must be complied with when a policy is issued in a given location. Further, in states where counter signature requirements are necessary, the system identifies the appropriate state regulation associated with the risk, and points to the individuals who will comply with any requirements. The graphical user interface shown in FIG. 7 is used to assist the user in selecting a person to sign the policy in the event that the user is not licensed to do business in the location applicable to the excess policy being quoted.

Furthermore, it is to be understood that although the present invention has been described with reference to a preferred embodiment, various modifications, known to those skilled in the art, may be made to the structures and process steps presented herein without departing from the invention as recited in the several claims appended hereto.

What is claimed is:

1. A computer-implemented system for managing the quotation of an excess casualty insurance policy for an insured having a primary insurance policy with at least one primary insurance limit amount, comprising:

(A) means for receiving and storing at least one standard industrial classification code ("SIC code") associated with said insured and a primary carrier name associated with said primary insurance policy;

(B) database means for storing a plurality of SIC code records corresponding to a plurality of SIC codes, each of said SIC code records including a minimum premium field for storing minimum premium amount information and a hazard rating field for storing hazard rating information associated with one of said plurality of SIC codes;

(C) said database means including means for storing a plurality of primary insurance carrier rating records corresponding to a plurality of primary insurance carriers, each of said primary insurance carrier rating records including a rating code field for storing a rating code representing a financial stability rating associated with one of said plurality of primary insurance carriers;

(D) means for retrieving, from said database means, a primary insurance carrier rating record associated with said primary carrier name and for comparing said rating code stored in said primary insurance carrier rating record to a predetermined rating level;

(E) means for declining said quotation if said rating code stored in said primary insurance carrier rating record is below said predetermined rating level;

(F) means for retrieving, from said database means, an SIC code record corresponding to said SIC code associated with said insured and for displaying hazard rating information stored in said SIC code record;

(G) means for receiving and storing one of a plurality of hazard codes selected in response to said displayed hazard rating information;

(H) means for displaying a plurality of candidate risk modifiers associated with said quotation and means for receiving and storing a risk modifier code selected from said plurality of candidate risk modifiers;

(I) means for selecting at least one insurance attachment point which is greater than said primary insurance limit amount and at least one insurance layer amount; and (I) means for generating said quotation from said minimum premium amount information stored in said SIC code record associated with said insured, said selected hazard code, said selected risk modifier code, said at least one insurance attachment point, and said at least one insurance layer amount.

2. The system of claim 1, wherein said means for declining said quotation further includes means documenting an explanation for issuing said quotation when said rating code stored in said primary insurance carrier rating record is below said predetermined rating level.

3. The system of claim 2, wherein said excess casualty insurance policy represents general liability insurance coverage.

4. The system of claim 3, wherein said excess casualty insurance policy further represents automobile liability coverage.

5. The system of claim 4, wherein said computer implemented system is formed of a plurality of remote workstations each of which is electronically coupled to a network server located at a home office, said database means being coupled to said network server at said home office.

* * * * *